US012005602B2

(12) United States Patent
Leifeld et al.

(10) Patent No.: US 12,005,602 B2
(45) Date of Patent: Jun. 11, 2024

(54) METHOD FOR PRODUCING WOOD FIBERBOARDS

(71) Applicant: BASF SE, Ludwigshafen am Rhein (DE)

(72) Inventors: Ferdinand Leifeld, Ludwigshafen (DE); Sabine Both, Monheim (DE); Achim Fessenbecker, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 120 days.

(21) Appl. No.: 16/964,342

(22) PCT Filed: Feb. 12, 2019

(86) PCT No.: PCT/EP2019/053408
§ 371 (c)(1),
(2) Date: Jul. 23, 2020

(87) PCT Pub. No.: WO2019/162145
PCT Pub. Date: Aug. 29, 2019

(65) Prior Publication Data

US 2021/0046668 A1 Feb. 18, 2021

(30) Foreign Application Priority Data

Feb. 20, 2018 (EP) .................................... 18157665

(51) Int. Cl.

| | |
|---|---|
| ***B27K 5/00*** | (2006.01) |
| ***B27N 1/00*** | (2006.01) |
| ***B27N 3/04*** | (2006.01) |
| ***B27N 3/12*** | (2006.01) |
| ***B27N 3/18*** | (2006.01) |

(52) U.S. Cl.
CPC ............ *B27K 5/007* (2013.01); *B27K 5/0085* (2013.01); *B27N 1/00* (2013.01); *B27N 3/04* (2013.01); *B27N 3/12* (2013.01); *B27N 3/18* (2013.01); *B27K 2200/10* (2013.01); *B27K 2200/15* (2013.01)

(58) Field of Classification Search
CPC .. B27K 5/007; B27K 5/0085; B27K 2200/10; B27K 2200/15; B27N 1/00; B27N 3/04; B27N 3/12; B27N 3/18; B27N 7/00
See application file for complete search history.

(56) References Cited

U.S. PATENT DOCUMENTS

| | | | | |
|---|---|---|---|---|
| 2013/0177742 A1 | 7/2013 | Siebert et al. | | |
| 2018/0305537 A1* | 10/2018 | Hara | ........................ | G02B 1/04 |

FOREIGN PATENT DOCUMENTS

| | | | | |
|---|---|---|---|---|
| EP | 2168738 A1 | 3/2010 | | |
| EP | 2619016 B1 | 4/2015 | | |
| EP | 3059056 A1 * | 8/2016 | | |
| EP | 3059056 A1 | 8/2016 | | |
| JP | H0663913 A | 3/1994 | | |
| JP | 2008023919 A | 2/2008 | | |
| WO | 2015104349 A2 | 7/2015 | | |
| WO | 2016091797 A1 | 6/2016 | | |
| WO | WO-2016091797 A1 * | 6/2016 | ............. | B27N 3/002 |
| WO | 2016156226 A1 | 10/2016 | | |

OTHER PUBLICATIONS

European Search Report for EP Patent Application No. 18157665.3, dated Nov. 9, 2018, 3 pages.
International Search Report and Written Opinion for corresponding PCT/EP2019/053408 dated Apr. 26, 2019, 11 pages.

* cited by examiner

*Primary Examiner* — Jacob T Minskey
*Assistant Examiner* — Caroline Beha
(74) *Attorney, Agent, or Firm* — Armstrong Teasdale LLP

(57) ABSTRACT

The disclosure relates to a method for the production of wood fiberboards such as MDF boards.

9 Claims, No Drawings

METHOD FOR PRODUCING WOOD FIBERBOARDS

CROSS-REFERENCE TO RELATED APPLICATIONS

This application is a U.S. National Phase Application of PCT/EP2019/053408, filed on Feb. 12, 2019, which claims the benefit of priority to European Patent Application Number 18157665.3, filed Feb. 20, 2018, the entire contents of which are hereby incorporated by reference herein.

The invention relates to a method for producing wood fiberboards such as MDF boards.

The market for medium-density fiberboards (MDF) and high-density fiberboards (HDF) has been growing for years. MDF and HDF boards can be processed like conventional particleboards. Because of their uniform structure, however, they are also suitable for producing profiled parts, and their use is becoming increasingly widespread in furniture construction.

For the production of fiberboards, wood is defibrated into wood particles, glued and pressed into boards. Wood of various types is used in this process, wherein coniferous woods such as spruce and pine are chiefly used. Other types of wood, such as beech or eucalyptus, can also be used.

The wood for fiber production is debarked and crushed into wood chips. After this, the wood chips are defibrated into wood particles in a milling apparatus, the so-called refiner.

The refiner can consist of two metal disks provided with a radial relief that are directly adjacent to each other. One of these disks may move, or both can turn in opposite directions. Refiners ordinarily operate under positive pressure. The wood chips are defibrated between these two disks, wherein the fineness of the fibers depends on the milling gap between the disks.

The defibration of wood chips consumes energy. The energy consumption in the refiner is up to 400 KW/h per ton of wood. The energy costs of defibration can account for up to 20% of the production costs of an MDF board. In order to reduce energy consumption, the wood chips can be subjected to hydrothermal pretreatment. For this purpose, the wood chips are ordinarily pretreated in a boiler at temperatures of 100 to 180° C. and a pressure of up to 10 bar. This treatment softens the middle lamella and facilitates defibration in the refiner.

In the next step, a binder such as urea-formaldehyde resin (UF resin), a mixed resin composed of urea and melamine (MUF resin), phenol formaldehyde resin (PF resin) or diisocyanate adhesive is added to the wood fiber pulp. The binder is ordinarily added to the still-wet fibers, but can also be added after drying. Addition to the wet fibers is ordinarily carried out in the so-called "blow line." Waxes can also be added together with the binder.

After this, the fibers are dried in a dryer to a residual moisture content of approximately 7% to 15%. In the following steps, the bonded fibers are scattered to form mats and precompacted (pre-pressed). After this, the precompacted mats are pressed into boards in heated presses at temperatures of 170 to 240° C.

Ordinarily, the boards must then be ground and polished in order to obtain a smooth surface, which can be lacquered or provided with a decorative layer. The grinding step is necessary because the boards often show insufficient fiber binding and rough areas on their surface resulting from uneven distribution.

An object of the invention is therefore to provide a method for producing wood fiberboards that alleviates or completely avoids the above-mentioned drawbacks. In particular, the aim is to provide a method for producing wood fiberboards in which the complexity of grinding is reduced and/or in which a better internal fiber bond and/or a smoother surface of the wood fiberboard produced is/are achieved and/or the wood fiberboards produced show better stability. A further object is to reduce the penetration of water into the fiberboard.

This is achieved according to the invention by the use of surfactants.

Although EP 2168738 does describe the use of surfactants in the production of wood fiberboards, the purpose of the surfactants in this case is to facilitate the penetration of an impregnated fluid into raw wood fiberboards. In this way, a predetermined final moisture is to be achieved. The type of surfactant used is not further specified.

EP 2619016 B1 discloses a method for producing wood panels, wherein in an embodiment, an additive is added prior to pressing of the wood material cake. The additive can contain a surfactant, but the surfactant is not further specified.

"Advantages of Alkylpolyglycoside Surfactants in Mechanical Pulping", IPCOM000230969D, describes the use of alkyl polyglycosides in the production of wood pulp for paper manufacturing.

Nevertheless, the above-mentioned publications do not contribute to achieving the above-mentioned object.

However, the above-mentioned object is achieved by the method according to the invention for producing wood fiberboards comprising the following steps:

a) crushing wood into wood chips,
b) hydrothermal pretreatment of the wood chips with steam in a pre-steaming bin at a temperature of 100 to 180° C. and a pressure of 1 to 10 bar,
c) grinding the pre-treated wood chips into fine wood particles in a refiner in the presence of steam at a temperature of 150° C. to 200° C. and a pressure of 4.5 to 16 bar,
d) gluing and drying the fine wood particles, wherein the drying of the wood particles can also be carried out prior to gluing,
e) forming mats from the bonded fibers and precompacting the mats,
f) pressing the glued and dried wood particles at a temperature of 170 to 240° C. into wood fiberboards, wherein grinding c) of the pre-treated wood chips into fine wood particles and/or gluing (as a rule in the so-called blow line (d)) and/or forming and precompacting the fibers (e) is carried out in the presence of one or a plurality of surfactants.

The object is further achieved by means of a method for producing fine wood particles comprising the following steps:

a) crushing wood into wood chips,
b) hydrothermal pretreatment of the wood chips with steam in a pre-steaming bin at a temperature of 100 to 180° C. and a pressure of 1 to 10 bar,
c) grinding the pre-treated wood chips into fine wood particles in a refiner in the presence of steam at a temperature of 150° C. to 200° C. and a pressure of 4.5 to 16 bar,
d) gluing and drying the fine wood particles, wherein drying of the wood particles can also be carried out prior to gluing, and wherein optionally one or a plurality of surfactants are injected with the glue into the blow line, e) forming mats from the bonded fibers and precompacting the mats, wherein optionally one or a plurality of surfactants is/are sprayed on or under the precompressed mat, and optionally f) pressing the glued and dried wood particles at a temperature of 170 to 240° C. into wood fiberboards.

Addition of the surfactants can be carried out in all steps of the process, or only in one or more steps of the process. For example, at least one surfactant can be added in step d) and/or in step e).

Surprisingly, several technical advantages are achieved by means of the method according to the invention.

The surface of the wood fiberboards surprisingly becomes more hydrophobic because of the addition of surfactants according to the invention. The surface of the wood fiberboards also becomes smoother, and grinding can be shortened or even dispensed with altogether. The subsequent coating process is also functionally improved.

Finally, in use of the method according to the invention, the wood fiberboards also show a more optically attractive appearance and increased stability.

In use in the refiner step, the surfactants can be added to the wood chips either in the pre-steaming bin or in the feeding screw upstream of the refiner. In use in the gluing step, the surfactants can be injected into the blow line as an aqueous solution. Aqueous solutions of the surfactants are also used for spraying onto or under the precompacted mat.

The amounts of the surfactants used are ordinarily 0.05% by weight to 5% by weight, preferably 0.1% by weight to 3% by weight, based on bone-dry (bd) wood.

The surfactants used can be anionic or nonionic. Combinations of a plurality of different surfactants can also be used.

Combinations containing nonionic surfactants or nonionic surfactants alone are preferably used.

The anionic surfactants can be sulfates, sulfonates or phosphates of branched or unbranched fatty alcohols or oxo alcohols, branched or unbranched fatty alcohol oxylates or oxo alcohol oxylates. Sulfates, sulfonates or phosphates of naphthyl alcohol or ethoxylated naphthyl alcohol, arylalkyl alcohols or arylalkyl ethoxylates are also possible.

Suitable anionic surfactants are fatty alcohol ether sulfates with branched or unbranched $C_8$-$C_{20}$ alkyl chains and 2 to 50 ethylene oxide (EO) units. Particularly preferred are fatty alcohol ether sulfates with a $C_8$-$C_{14}$alkyl chain and 2 to 12 ethylene oxide units.

Also suitable are fatty alcohol ether sulfates with a $C_8$-$C_{14}$ alkyl chain and 2 to 12 ethylene oxide units.

The nonionic surfactants can be alkyl alcohol alkoxylates with an unbranched or branched, primary or secondary alkyl chain, or aryl alkoxylates. Preferred are alkyl or aryl alkoxylates of formula (I)

(I)

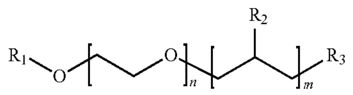

where $R_1$=linear or branched, primary or secondary $C_4$-$C_{24}$ alkylphenyl and naphthyl, $R_2$=linear or branched $C_1$-$C_{16}$ alkyl, $R_3$=H, benzyl, linear or branched $C_1$-$C_{18}$ alkyl, n=1-200, m=0-80, wherein the alkylene oxide units can be arranged blockwise or statistically in any desired order.

Further usable nonionic surfactants are branched or unbranched $C_8$ to $C_{15}$ alkyl ethoxylates with 3 to 20 ethylene oxide units.

Further usable nonionic surfactants are branched or unbranched $C_8$ to $C_{15}$ alkyl ethoxylates with 3 to 20 ethylene oxide units.

The nonionic surfactants can be PO/EO block copolymers.

In a preferred embodiment, the nonionic surfactants can be alkyl polyglycosides based on $C_5$ sugars or $C_6$ sugars or mixtures thereof, preferably of the general formula (IIa) or (IIb)

$$R_1O(R_2O)_b(Z)_a \quad \text{(IIa)}$$

$$R_1O(Z)_a(R_2O)_bH \quad \text{(IIb)}$$

where $R_1$=linear or branched $C_4$-$C_{30}$ alkyl, $R_2$=$C_2$-$C_4$ alkylene, Z=independently of one another, a sugar radical, preferably glucose or xylose, b=0-12, a=1-15, fractional numbers are also possible.

In preferred alkyl polyglycosides, $R_1$ is a linear or branched $C_8$ to $C_{16}$ alkyl radical, b=0 and a=1.1-4.

In the context of the present invention, "wood particles", "wood chips", "fine wood particles", "fibres" is understood to refer to finely particulate cellulose-containing particles. This includes for example fibers and chips of wood and other cellulose-containing materials. All fibrous materials obtainable from plants can be used as a base material for the wood particles and wood fiberboards. For example, wood is ordinarily used as a raw material, but suitable cellulose-containing particles can also be obtained from palms and annual plants such as bagasse or straw. Agricultural waste products are a further source. Preferred base materials are light wood types, in particular spruce or pine, but darker wood types such as beech or eucalyptus can also be used.

The wood materials (cellulose-containing raw materials) are crushed and optionally washed in step a) of the method according to the invention. This is followed by hydrothermal pretreatment of the wood chips with steam.

In step b) of the method according to the invention, the crushed wood materials are pre-treated with steam in a pre-steaming bin (boiler). This is preferably carried out at a pressure of 1 to 10 bar and a temperature of 100 to 180° C. The exact temperatures and pressures depend on the respective raw materials used. For crushing of annual plants, lower temperatures than those required for crushing perennial plants such as wood are ordinarily sufficient.

In step c), the hydrothermally pre-treated crushed wood material is transferred to a so-called refiner, where it is ground into fine particulate particles. A refiner is ordinarily a grinding apparatus with rotating and optionally stationary blades or disks for grinding fiber materials, and preferably comprises two metal disks equipped with radial relief that are closely adjacent to each other. Of these two disks, one can move and the other can be stationary, but both disks can also turn in opposite directions. The refiner is ordinarily operated under positive pressure.

Grinding of the pre-treated crushed wood materials can also be carried out in other apparatuses suitable for this purpose.

The production of wood fibers for MDF boards in the refiner generally takes place at temperatures of 150 to 180° C., and preferably at approx. 170° C.

The surfactants can be added according to the invention at various points in the process. The first dosing possibility is the refiner or the pre-steaming bin upstream of the refiner. The amount of the surfactants used is 0.05% by weight to 5% by weight, preferably 0.1% by weight to 3% by weight, based on bone-dry (bd) wood.

In step d) of the method according to the invention, the fine wood particles are glued and dried, wherein drying of the wood particles can also be carried out prior to gluing. In an embodiment of the invention, surfactants can be added at this point.

Ordinarily, the wood particles are discharged from the refiner by the positive pressure prevailing in the refiner via a blow line. The wood particles can then be directly, i.e. while still wet, glued in the blow line. The second possibility for dosing the surfactants according to the invention is the blow line. The surfactants can be added as an aqueous solution by injection into the blow line. The amount of the surfactants used is 0.05% by weight to 5% by weight, preferably 0.1% by weight to 3% by weight, based on bone-dry (bd) wood. After this, they pass through a dryer, in which they are dried to a residual moisture content of 8 to 15%.

In another embodiment, the wood particles are first dried, and then glued in a dry state and further processed.

The wood materials produced according to the invention can be MDF, HDF, chipboard or OSB boards. Preferred are MDF and HDF boards, and particularly preferred are MDF boards.

MDF, HDF, OSB and particleboards are also referred to as wood material boards. They are produced by pouring bonded fibers or chips into mats, optionally cold-precompacting them, and pressing them into boards in heated presses at temperatures of 170 to 240° C. At this point in the method, in an embodiment of the present invention, surfactants can also be added, preferably by spraying the surfactants as an aqueous solution onto or under the precompacted mat.

The binders used as a glue are ordinarily urea-formaldehyde resins that are partially reinforced with melamine, urea-melamine-formaldehyde resins, melamine-formaldehyde resins, phenol-melamine resins and phenol-formaldehyde resins. Isocyanates are used as a further binder, ordinarily based on polymethylene diisocyanate.

The wood particles can be directly glued, i.e. while still wet, in the blow line. However, pre-dried wood particles can also be glued in mixers, preferably continuously operating mixers. Gluing in mixers is particularly preferred in the production of particleboard and OSB, and gluing is preferably carried out in the blow line in production of HDF and MDF boards. A further possible method of gluing is so-called dry gluing, in which the dried wood particles are sprayed with glue.

If the wood particles are glued in the blow line, they then pass through a dryer, in which they are dried to a residual moisture content of 8 to 15% by weight.

In step e) of the method according to the invention, the glued and dried wood particles are then poured into mats, optionally cold-precompacted and pressed into boards in heated presses at temperatures of 170 to 240° C.

A further possible manner of dosing the surfactants according to the invention is that of precompacting the fiber mats upstream of the heated press. The surfactants can be sprayed as an aqueous solution onto or under the fiber mat. The amount of the surfactants used is 0.05% by weight to 5% by weight, preferably 0.1% by weight to 3% by weight, based on bone-dry (bd) wood.

Several aspects of the present invention will now be explained in further detail by means of the following illustrative examples.

For all tests, spruce wood chips were defibrated in the refiner and glued in the blow line using the glue formulation shown in Table 1.

The wood chips were defibrated in a refiner at a temperature of approx. 180° C., a pressure of approx. 9 bar, and with a milling gap of 0.12 mm. The dwell time in the boiler upstream of the refiner was 3 to 4 minutes. The energy required was measured during the milling process.

The unit of defibration energy is kWh/t bd. Bd stands for "bone-dry wood."

TABLE 1

| Glue formulation | |
|---|---|
| Urea-melamine formaldehyde resin, 66.5% in water | 100.0 parts by weight |
| Paraffin dispersion, 60% by weight in water | 4.0 parts by weight |
| Water | 33.8 parts by weight |
| Solid resin content of liquor | 48% |
| Solid resin/bone-dry fibers | 14% |
| Liquor per 100 kg bd fiber weight | 29.2 kg |

EXAMPLE 1

The bonded fibers are then dried in a dryer to a moisture content of approx. 8% by weight, poured to form a mat, precompressed and pressed at 220° C. into a board approx. 4 mm thick.

The MDF boards have a rough surface with dark areas.

In order to test the hydrophobicity of the surfaces, a drop of water is dripped onto the surface, and the time required for the drop to be completely absorbed into the board is measured.

In a second test, the transverse tensile strength of the board is measured (according to EN 319); the results are shown in Table 2.

TABLE 2

| MDF board | Transverse tensile strength ($N/mm^2$) | Drop absorption time in sec |
|---|---|---|
| Example 1 | 0.88 | 68 |

EXAMPLE 2

In example 2, spruce wood chips are defibrated in the presence of $C_8$-$C_{10}$ alkyl polyglycoside. The surfactant is dosed directly into the refiner as a 25% aqueous solution containing 1% of active surfactant based on the amount of wood.

The bonded fibers are then dried in a dryer to a moisture content of approx. 8% by weight, poured into a mat, precompacted and pressed at 220° C. into a board approx. 4 mm in thickness.

The boards have a smooth, glossy and homogeneous surface (also see Table 3).

TABLE 3

| MDF board | Transverse tensile ($N/mm^2$) strength | Drop absorption time in sec |
|---|---|---|
| Example 2 | 1.02 | 476 |

EXAMPLE 3

In example 3, spruce wood chips are defibrated in a refiner and glued together in the blow line. At the same time, a 20% solution of a $C_8$-$C_{14}$ alkyl polyglycoside containing 0.5% of active surfactant based on the amount of wood is injected into the blow line.

The bonded fibers are then dried in a dryer to a moisture content of approx. 8% by weight, poured into a mat, precompacted and pressed at 220° C. into a board approx. 4 mm in thickness.

The boards have a smooth, glossy and homogeneous surface (also see Table 4).

TABLE 4

| MDF board | Transverse tensile strength ($N/mm^2$) | Drop absorption time in sec |
|---|---|---|
| Example 3 | 1.21 | 780 |

EXAMPLE 4

In example 4, spruce wood chips are defibrated in a refiner and glued together in the blow line. At the same time, a 20% solution of a $C_{13}$oxo alcohol ethoxylate+12 EO units containing 0.5% active surfactant based on the amount of wood is injected into the blow line.

The bonded fibers are then dried in a dryer to a moisture content of approx. 8% by weight, poured into a mat, precompacted and pressed at 220° C. into a board approx. 4 mm in thickness.

The boards have a smooth, glossy and homogeneous surface (also see Table 5).

TABLE 5

| MDF board | Transverse tensil strength ($N/mm^2$) | Drop absorption time in sec |
|---|---|---|
| Example 4 | 0.98 | 346 |

EXAMPLE 5

In example 5, spruce wood chips are defibrated in a refiner and glued together in the blow line.

The bonded fibers are then dried in a dryer to a moisture content of approx. 8% by weight, poured into a mat and precompacted. A 20% solution of a $C_8$-$C_{14}$ alkyl polyglycoside is sprayed onto the precompacted mats, wherein 0.4% of active surfactant is used based on the amount of wood. After this, the mat is pressed at 220° C. into a board approx. 4 mm in thickness.

The treated side of the board is smooth, glossy and homogeneous. The untreated side is rough and spotted (also see Table 6).

TABLE 6

| MDF board | Transverse tensile strength ($N/mm^2$) | Drop absorption time in sec |
|---|---|---|
| Example 5, treated side | 1.26 | 720 |
| Example 5, untreated side | 1.26 | 93 |

EXAMPLE 6

In example 6, spruce wood chips are defibrated in a refiner and glued together in the blow line. At the same time, a 20% solution of the sodium salt of a fatty alcohol ether sulfate with 12 EO units containing 0.7% active surfactant based on the amount of wood is injected into the blow line.

The bonded fibers are then dried in a dryer to a moisture content of approx. 8% by weight, poured into a mat, precompacted and pressed at 220° C. into a board approx. 4 mm in thickness.

The boards have a smooth, glossy and homogeneous surface (also see Table 7).

TABLE 7

| MDF board | Transverse tensile strength ($N/mm^2$) | Drop absorption time in sec |
|---|---|---|
| Example 6 | 1.07 | 423 |

The invention claimed is:

1. A method for the production of wood fiberboards, comprising the following steps:

a) crushing wood into wood chips, b) hydrothermally pretreating the wood chips with steam in a pre-steaming bin at a temperature of 100 to 180° C. and a pressure of 1 to 10 bar, c) grinding the pre-treated wood chips into fine wood particles in a refiner in a presence of steam at a temperature of 150 to 200° C. and a pressure of 4.5 to 16 bar, d) gluing and drying the fine wood particles, wherein the drying of the fine wood particles can also be carried out prior to gluing, e) forming mats from bonded fibers and precompacting the mats, f) pressing the glued and dried fine wood particles at a temperature of 170 to 240° C. into wood fiberboards, wherein at least one of steps d) to e) is carried out in a presence of one or a plurality of surfactants added in step d) and/or in step e);

wherein the surfactants are selected from alkyl polyglycosides of the general formula (IIa) or (IIb)

$$R_1O(R_2O)_b(Z)_a \quad \text{(IIa)}$$

$$R_1O(Z)_a(R_2O)_bH \quad \text{(IIb)}$$

wherein $R_1$=linear or branched $C_4$-$C_{30}$ alkyl, $R_2$=$C_2$-$C_4$ alkylene, Z=independently, one sugar radical each with 5 or 6 carbon atoms, b=0-12, and a=1-15; and wherein in step d) at least one surfactant is injected with the glue into the blow line and/or in step e) at least one surfactant is sprayed on or under the precompressed mat.

2. The method according to claim 1, wherein step d) is carried out in the presence of one or a plurality of surfactants.

3. The method according to claim 1, wherein step e) is carried out in the presence of one or a plurality of surfactants.

4. The method according to claim 1, wherein the surfactants are nonionic surfactants.

5. The method according to claim 1, wherein an amount of surfactants in step c) is 0.05 to 5% by weight based on bone-dry wood.

6. The method according to claim 1, wherein the fine wood particles are reductively bleached.

7. The method according to claim 1, wherein the wood fiberboards are medium-density fiberboards.

8. The method according to claim 1, wherein the surfactants are selected from alkyl polyglycosides of the general formula (IIa) or (IIb)

$$R_1O(R_2O)_b(Z)_a \quad \text{(IIa)}$$

$$R_1O(Z)_a(R_2O)_bH \quad \text{(IIb)}$$

wherein $R_1$=linear or branched $C_6$-$C_{30}$ alkyl, $R_2$=$C_2$-$C_4$ alkylene, Z=independently, one sugar radical each with 5 or 6 carbon atoms, b=0-12, and a=1-10.

9. The method according to claim 8, wherein $R_1$ is a $C_8$-$C_{16}$ alkyl chain, b=0 and a=1-4.

* * * * *